T. J. PALMER.
Sofa and Chair Frame.
No. 8,636. Reissue Design Mar. 25, 1879.
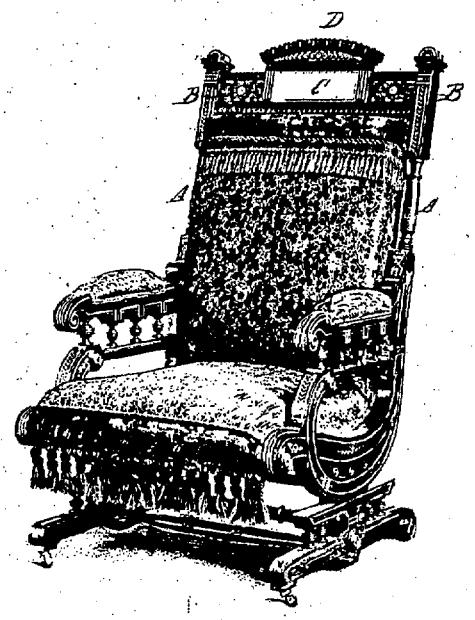
Witnesses:
Carl Karp
F. Dunl
Theodore J. Palmer
by Paul Goepel
Attorney

UNITED STATES PATENT OFFICE.

THEODORE J. PALMER, OF NEW YORK, N. Y.

DESIGN FOR SOFA AND CHAIR FRAMES.

Specification forming part of Design No. 11,005, dated January 28, 1879; Reissue No. 8,636, dated March 25, 1879; application filed February 27, 1879.

*To all whom it may concern:*

Be it known that I, THEODORE J. PALMER, of the city, county, and State of New York, have invented a new and original Design for Sofa and Chair Frames, of which the following is a full, clear, and exact description, reference being had to the accompanying illustration, making part of this specification, by which the nature of my design is fully shown.

The object of this invention is to improve the appearance of the top or crown panels of sofa and chair frames in such a manner that a certain degree of lightness, combined with a rich and elegant appearance, is imparted to the same.

The invention consists of a design for sofa and chair frames having a top panel that is provided with a mirror or plate glass panel of any length, and surmounted by an ornamental center-piece.

Referring to the illustration, A represents the frame of a sofa, rocking or other chair; and B, the top or center panel of the same, which is supported by suitable ornamental pillars. The top or center panel, B, extends from pillar to pillar, above the upholstered or other back, and is made solid or otherwise, as shown.

For the purpose of relieving the rather substantial and heavy appearance of the top panel, a panel, C, of mirror or plate glass is arranged in the top panel. This glass panel may be etched or otherwise ornamented, and is surrounded by a frame or border. The glass panel C may be made of any length, and is surmounted by a segmental crown-shaped center-piece, D, that forms, with the frame of the glass panel, a small segmental panel, which is fitted by a suitable ornament. The mirror or glass panel imparts, by its reflecting quality, a light and pleasing appearance to the top portion of the frame, and gives a very stylish and ornamental character to the same.

Having thus described my invention, I claim as new and desire to secure by Letters Patent—

1. The design for a sofa and chair frame, having a top panel provided with a mirror or plate glass panel, substantially as shown.

2. The design for a sofa or chair frame, having a top panel provided with a panel of mirror or plate glass, surmounted by a crown or center piece, substantially as shown.

In testimony that I claim the foregoing as my invention I have signed it this 26th day of February, 1879.

THEODORE J. PALMER.

Witnesses:

PAUL GOEPEL,

CARL RAY.